US012802163B2

(12) United States Patent
Yang et al.

(10) Patent No.: US 12,802,163 B2
(45) Date of Patent: Nov. 17, 2026

(54) IMAGE PROCESSING METHOD, APPARATUS, DEVICE AND STORAGE MEDIUM

(71) Applicants: Douyin Vision Co., Ltd., Beijing (CN); Lemon Inc., Grand Cayman (KY)

(72) Inventors: Jinhai Yang, Beijing (CN); Mengxi Guo, Beijing (CN); Shijie Zhao, Beijing (CN); Junlin Li, Los Angeles, CA (US)

(73) Assignees: Douyin Vision Co., Ltd., Beijing (CN); Lemon Inc, Grand Cayman (KY)

( * ) Notice: Subject to any disclaimer, the term of this patent is extended or adjusted under 35 U.S.C. 154(b) by 161 days.

(21) Appl. No.: 18/956,726

(22) Filed: Nov. 22, 2024

(65) Prior Publication Data

US 2025/0173824 A1 May 29, 2025

(30) Foreign Application Priority Data

Nov. 28, 2023 (CN) ......................... 202311607860.7

(51) Int. Cl.
*G06T 3/4046* (2024.01)
*G06T 3/18* (2024.01)

(52) U.S. Cl.
CPC .............. *G06T 3/4046* (2013.01); *G06T 3/18* (2024.01)

(58) Field of Classification Search
CPC ................................ G06T 3/4046; G06T 3/18
See application file for complete search history.

(56) References Cited

U.S. PATENT DOCUMENTS

| | | | | |
|---|---|---|---|---|
| 11,445,222 | B1 * | 9/2022 | Andreopoulos | G06N 3/045 |
| 2020/0304147 | A1 * | 9/2020 | Choi | H04N 19/13 |
| 2021/0160512 | A1 * | 5/2021 | Liu | H04N 21/23655 |
| 2022/0109860 | A1 * | 4/2022 | Chen | H04N 19/186 |
| 2022/0237740 | A1 * | 7/2022 | Lu | G06T 3/4046 |
| 2022/0286696 | A1 * | 9/2022 | Gao | H04N 19/147 |
| 2023/0100615 | A1 * | 3/2023 | Yuan | G06T 3/4007 348/43 |
| 2023/0116696 | A1 * | 4/2023 | Schroers | G06N 3/0464 375/240.02 |
| 2023/0186429 | A1 * | 6/2023 | Norouzzadeh | G06N 3/045 |
| 2024/0221114 | A1 * | 7/2024 | Liu | G06T 3/4053 |
| 2025/0119552 | A1 * | 4/2025 | Zhang | H04N 19/85 |

* cited by examiner

*Primary Examiner* — David Bilodeau

(57) ABSTRACT

Embodiments of the present disclosure provide an image processing method and apparatus, a device and a storage medium. The method comprises: determining, based on an original size and a processed target size corresponding to a first image to be processed, a target downsampling rate corresponding to the first image; determining a target downsampling network model corresponding to the first image based on the target downsampling rate, at least one pre-trained and obtained downsampling network model and a preset downsampling rate corresponding to the downsampling network model; determining a second image satisfying a preset downsampling condition based on a preset downsampling rate corresponding to the target downsampling network model, the target downsampling rate and the first image; downsampling the second image based on the target downsampling network model to obtain a target image having the target size.

20 Claims, 4 Drawing Sheets

IMAGE PROCESSING METHOD, APPARATUS, DEVICE AND STORAGE MEDIUM

CROSS-REFERENCE TO RELATED APPLICATION(S)

This application claims priority to Chinese Application No. 202311607860.7 filed Nov. 28, 2023, the disclosure of which is incorporated herein by reference in its entity.

FIELD

Embodiments of the present disclosure relate to computer technology, and more specifically, to an image processing method, apparatus, a device and a storage medium.

BACKGROUND

With rapid development of computer technology, it is usually required to downsample an image to downsize the image size to fit in a screen size or generate thumbnail etc. At present, images are usually downsampled using image interpolation. For example, pixels in each window of the original image are mapped to a single pixel in a target image, to implement image downsampling.

SUMMARY

The present disclosure provides an image processing method and apparatus, a device and a storage medium, to improve the image quality after downsampling. Besides, the image may be downsampled to any size and the flexibility of image downsampling is also enhanced.

In a first aspect, embodiments of the present disclosure provide an image processing method, comprising:

- determining, based on an original size and a processed target size corresponding to a first image to be processed, a target downsampling rate corresponding to the first image;
- determining a target downsampling network model corresponding to the first image based on the target downsampling rate, at least one pre-trained and obtained downsampling network model and a preset downsampling rate corresponding to the downsampling network model;
- determining a second image satisfying a preset downsampling condition based on a preset downsampling rate corresponding to the target downsampling network model, the target downsampling rate and the first image;
- downsampling the second image based on the target downsampling network model to obtain a target image having the target size.

In a second aspect, embodiments of the present disclosure also provide an image processing apparatus, comprising:

- a downsampling rate determination module for determining, based on an original size and a processed target size corresponding to a first image to be processed, a target downsampling rate corresponding to the first image;
- a network model determination module for determining a target downsampling network model corresponding to the first image based on the target downsampling rate, at least one pre-trained and obtained downsampling network model and a preset downsampling rate corresponding to the downsampling network model;
- a second image determination module for determining a second image satisfying a preset downsampling condition based on a preset downsampling rate corresponding to the target downsampling network model, the target downsampling rate and the first image;
- a downsampling processing module for downsampling the second image based on the target downsampling network model to obtain a target image having the target size.

In a third aspect, embodiments of the present disclosure provide an electronic device, the electronic device comprising:

- one or more processors;
- a memory for storing one or more programs,
- when the one or more programs are executed by the one or more processors, the one or more processors are enabled to implement the image processing method according to any embodiment of the present disclosure.

In a fourth aspect, embodiments of the present disclosure provide a storage medium containing computer-executable instructions, the computer-executable instructions, when performed by a computer processor, implementing the image processing method according to any embodiment of the present disclosure.

The embodiments of the present disclosure determine, based on an original size and a processed target size corresponding to a first image to be processed, a target downsampling rate corresponding to the first image; determine, from at least one downsampling network model, a target downsampling network model corresponding to the first image based on the target downsampling rate, at least one pre-trained and obtained downsampling network model and a preset downsampling rate corresponding to the downsampling network model; determine a second image satisfying a preset downsampling condition based on a preset downsampling rate corresponding to the target downsampling network model, the target downsampling rate and the first image.

BRIEF DESCRIPTION OF THE DRAWINGS

Through the following detailed description with reference to the accompanying drawings, the above and other objectives, features, and advantages of embodiments of the present disclosure will become more apparent. Throughout the drawings, same or similar reference signs indicate same or similar elements. It should be appreciated that the drawings are schematic and the original components and the elements are not necessarily drawn to scale.

DETAILED DESCRIPTION OF EMBODIMENTS

It should be noted that, however, such downsampling is quite rough and fails to effectively ensure the image quality after the downsampling.

Embodiments of the present disclosure will be described below in more details with reference to the drawings. Although the drawings illustrate some embodiments of the present disclosure, it should be appreciated that the present disclosure can be implemented in various manners and should not be limited to the embodiments explained herein. On the contrary, the embodiments are provided for a more thorough and complete understanding of the present disclosure. It is to be understood that the drawings and the embodiments of the present disclosure are provided merely for the exemplary purpose, rather than restricting the protection scope of the present disclosure.

It should be appreciated that various steps disclosed in the method implementations of the present disclosure may be executed by different orders, and/or in parallel. Besides, the method implementations may include additional steps and/or omit the illustrated ones. The scope of the present disclosure is not restricted in this regard.

The term "includes" and its variants are to be read as open-ended terms that mean "includes, but is not limited to." The term "based on" is to be read as "based at least in part on." The term "one embodiment" is to be read as "at least one embodiment." The term "a further embodiment" is to be read as "at least one further embodiment." The term "some embodiments" is to be read as "at least some embodiments." Definitions related to other terms will be provided in the following description.

It is noted that the terms "first", "second" and so on mentioned in the present disclosure are provided only to distinguish different apparatuses, modules or units, rather than limiting the sequence of the functions executed by these apparatuses, modules or units or dependency among apparatuses, modules or units.

It is reminded here that the modifications including "one" and "more" in the present disclosure are schematic and non-restrictive. Those skilled in the art should understand that the above modifications are to be interpreted as "one or more" unless indicated otherwise in the context.

Names of messages or information exchanged between a plurality of apparatuses in the implementations of the present disclosure are provided only for explanatory purposes, rather than being restrictive.

It is to be understood that data (including but not limited to data per se, acquisition or use of the data) involved in the technical solution should comply with corresponding laws and regulations.

Figure 1:
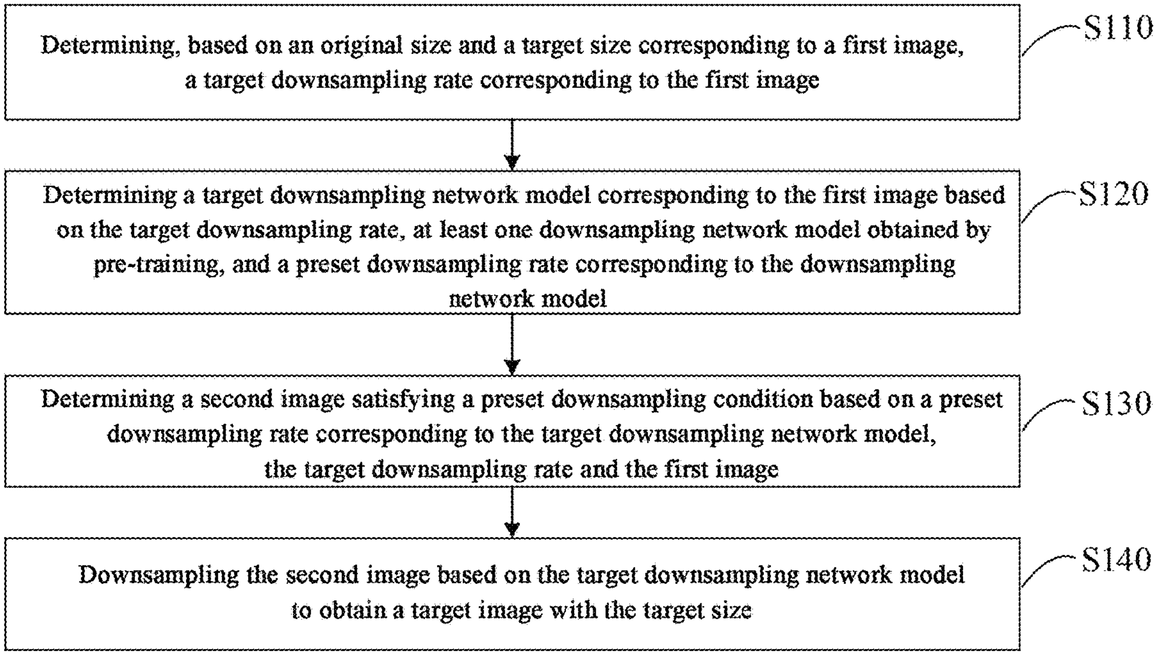
FIG. 1 illustrates a schematic flowchart of an image processing method provided by embodiments of the present disclosure.

FIG. 1 illustrates a schematic flowchart of an image processing method provided by embodiments of the present disclosure. Embodiments of the present disclosure are applicable to downsampling an image to any specified size. The method may be executed by an image processing apparatus, which apparatus may be implemented in the form of software and/or hardware. Optionally, the apparatus is implemented by an electronic device, the electronic device being a mobile terminal, a PC terminal or a server etc.

As shown in FIG. 1, the image processing method specifically includes steps of:

S110: determining, based on an original size and a processed target size corresponding to a first image to be processed, a target downsampling rate corresponding to the first image.

Wherein the first image may be an original image to be processed. A single image to be processed may be downsampled as the first image, or each frame of images in a video to be processed also may be video downsampled as the first image. The first image may be an RGB (Red Green Blue) color image having three channels. The original size indicates the existing size of the first image and the target size refers to a specific size to which the first image is downsampled. The target size may be any size. The target size is smaller than the original size. The target downsampling rate may indicate a multiple of the downsampling performed on the first image, and may be any numerical values greater than 1. The target downsampling rate may be an integer rate or a fractional rate (i.e., decimal rate).

Specifically, the original size corresponding to the first image to be processed may be divided by the target size, and the division result is determined as the target downsampling rate corresponding to the first image. For example, in case that the target downsampling rate is 2, i.e., an integer rate, it indicates that the first image is downsampled by a multiple of 2. Where the target downsampling rate is 3/2, i.e., a fractional rate, it indicates that the first image is downsampled by a multiple of 1.5.

S120: determining a target downsampling network model corresponding to the first image based on the target downsampling rate, at least one pre-trained and obtained downsampling network model and a preset downsampling rate corresponding to the downsampling network model.

Wherein the downsampling network model may be a deep learning network model that correspondingly downsamples the image at the preset downsampling rate. The preset downsampling rate may be a pre-configured downsampling rate that can be implemented by the downsampling network model. One or more downsampling network models may be provided. Each downsampling network model is pre-trained based on the sample images, to ensure image quality after the downsampling. Each downsampling network model can only fulfill the downsampling at a fixed rate. Different downsampling network models correspond to various preset downsampling rates, to implement the downsampling at distinct rates. The target downsampling network model may refer to a downsampling network model that is the best match for the first image. For example, in case that a preset downsampling rate corresponding to a given downsampling network model is N and the image size input to the downsampling network model is (W, H), then the image size output by the downsampling network model is (W/N, H/N) or (round(W/N), round (H/N)), where round is a rounding function.

Specifically, in case that only one downsampling network model is pre-trained, i.e., there is currently only one downsampling network model, this downsampling network model may directly serve as the target downsampling network model corresponding to the first image. In case that at least two downsampling network models are pre-trained, i.e., there are currently at least two downsampling network models, the preset downsampling rate corresponding to each downsampling network model may be compared with the target downsampling rate, and the target downsampling network model is determined from the at least two downsampling network models based on the comparison result, so as to more accurately downsample the images using the target downsampling network model and further ensure the image quality after the downsampling.

As an example, S120 may include: determining a rate difference between the target downsampling rate and a preset downsampling rate corresponding to each pre-trained and obtained downsampling network model; determining, based on the rate difference corresponding to each downsampling network model, a target downsampling network model corresponding to the first image.

To be specific, a rate difference corresponding to each downsampling network model is produced from subtracting the preset downsampling rate corresponding to each downsampling network model from the target downsampling rate. The downsampling network model having the minimum rate difference is determined as the target downsampling network model. That is, the downsampling network model having a downsampling rate closest to the target downsampling rate is determined as the target downsampling network model. The quality of the post-downsampling images gets higher as the rate difference between the preset downsampling rate corresponding to the target downsampling network model and the target downsampling rate narrows.

S130: determining a second image satisfying a preset downsampling condition based on a preset downsampling rate corresponding to the target downsampling network model, the target downsampling rate and the first image.

Wherein the preset downsampling condition may be a pre-configured condition under which the downsampling may be performed using the target downsampling network model. The second image may indicate an image that can be downsampled using the target downsampling network model. For instance, the preset downsampling condition may be set as a ratio of the size of the second image to the target size being the preset downsampling rate corresponding to the target downsampling network model. In such case, the image of the target size may be obtained after the downsampling is performed using the target downsampling network model.

Specifically, the preset downsampling rate corresponding to the target downsampling network model may be compared with the target downsampling rate and it is determined whether the first image satisfies the preset downsampling condition based on the comparison result. If satisfied the preset downsampling condition, the first image is determined as the second image; if not satisfied the preset downsampling condition, the first image is pre-sampled to obtain the second image satisfying the preset downsampling condition.

As an example, S130 may include: if a preset downsampling rate corresponding to the target downsampling network model is equal to the target downsampling rate, determining the first image as a second image satisfying a preset downsampling condition; if a preset downsampling rate corresponding to the target downsampling network model is not equal to the target downsampling rate, pre-sampling the first image based on a preset downsampling rate corresponding to the target downsampling network model and the target size, to determine a second image satisfying a preset downsampling condition.

Specifically, when the preset downsampling rate corresponding to the target downsampling network model is equal to the target downsampling rate, it indicates that the target downsampling network model may be directly used to perform the downsampling at the target downsampling rate. At this point, the first image may be determined as the second image satisfying the preset downsampling condition. When the preset downsampling rate corresponding to the target downsampling network model is not equal to the target downsampling rate, it indicates that the downsampling at the target downsampling rate could not be executed directly by the target downsampling network model. In such case, it is required to pre-upsample or pre-downsample the first image in accordance with the preset downsampling rate corresponding to the target downsampling network model and the target size, so as to obtain a second image satisfying the preset downsampling condition.

S140: downsampling the second image based on the target downsampling network model to obtain a target image having the target size.

To be specific, the second image satisfying the preset downsampling condition may be directly input to the target downsampling network model for downsampling. The target downsampling network model downsamples the input second image at the corresponding preset downsampling rate, to obtain and output the target image with the target size, thereby downsampling the first image to the target size, conducting a deep learning on the downsampling treatment using the pre-trained and obtained target downsampling network model and further improving the image quality after the downsampling.

The technical solution according to the embodiments of the present disclosure determines, based on an original size and a processed target size corresponding to a first image to be processed, a target downsampling rate corresponding to the first image; determines, from at least one downsampling network model, a target downsampling network model corresponding to the first image based on the target downsampling rate, at least one pre-trained and obtained downsampling network model and a preset downsampling rate corresponding to the downsampling network model; determines a second image satisfying a preset downsampling condition based on a preset downsampling rate corresponding to the target downsampling network model, the target downsampling rate and the first image. As a result, the target downsampling network model is directly used to downsample the second image at the corresponding preset downsampling rate, so as to obtain the target image having the target size. As the pre-trained and obtained target downsampling network model conducts a deep learning of the downsampling treatment, the image quality after the downsampling may be improved. Besides, by determining a matching target downsampling network model and a second image satisfying the preset downsampling condition, the image may be downsampled to any size and the flexibility of image downsampling is enhanced.

Based on the above technical solution, a training procedure of each downsampling network model includes: upsampling a sample image at a preset downsampling rate corresponding to a downsampling network model as an upsampling rate, to obtain an upsampled image; inputting the upsampled image to a downsampling network model to be trained for downsampling, so as to obtain an output image of a downsampling network model; determining a training error based on the output image and the sample image, and propagating the training error back to a downsampling network model to be trained for network parameter adjustment; and determining that training of a downsampling network model is finished until a preset convergence condition is reached.

To be specific, each downsampling network model may be trained separately to ensure that they can accurately perform the downsampling at the corresponding preset downsampling rate. The sample image may be high-definition high-resolution image to enhance the model training effects.

Figure 2:
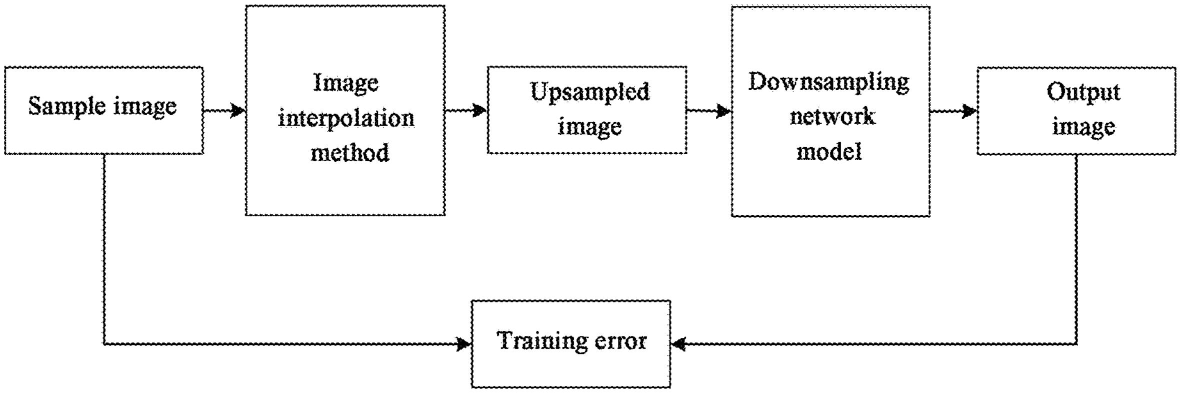
FIG. 2 illustrates a schematic flowchart of another image processing method provided by embodiments of the present disclosure.

For example, FIG. 2 illustrates an example of a training procedure of a downsampling network model. As shown, with image interpolation, such as bicubic interpolation, orthogonal similarity transformation Lanczos method and the like, the preset downsampling rate N corresponding to the downsampling network model is used as the upsampling rate, to upsample the sample image at the N rate, thereby obtaining an upsampled image corresponding to the sample image. The resolution of the sample image is thus increased by N times and a high-resolution degraded upsampled image is obtained. Since the upsampling in the form of image interpolation is considered as a low pass filter, the subjective visual quality of the upsampled image may reduce relative to the original sample image. The upsampled image is input to the downsampling network model to be trained for downsampling treatment at the corresponding preset downsampling rate, to obtain an output image of the downsampling network model. As the output image is obtained from upsampling the sample image at the N rate and then downsampling at the N rate and the output image has the same size as the original sample image, i.e., the same image resolution, a training error between the output image and the sample image may be determined by a preset loss function. For example, the training error is $$\text{loss}(y, y') = \frac{1}{n}\sum_{i=1}^{n}|y_i - y'_i| \text{ or } \text{loss}(y, y') = \frac{1}{n}\sum_{i=1}^{n}(y_i - y'_i)^2,$$

where y is the output image, y' refers to the sample image, i indicates pixels in the image and n represents the number of pixels in the image. The training error is propagated back to the downsampling network model to be trained for network parameter adjustment; it is determined that the training of the downsampling network model is finished until a preset convergence condition is reached, e.g., iteration number being equal to a preset number or the training error levelling off. Accordingly, downsampling network parameters are optimized via stochastic gradient descent among other algorithms and a downsampling network model with better downsampling effects is obtained.

It is to be explained that during the training procedure of the downsampling network model, distortion constraints of high-quality image may be directly applied to the output image of the downsampling network model by determining the training error between the output image and the sample image, such that the output image is closer to the original sample image. As a result, the quality of the output image of the downsampling network model is guaranteed and the definition of the downsampled image is effectively improved.

Figure 3:
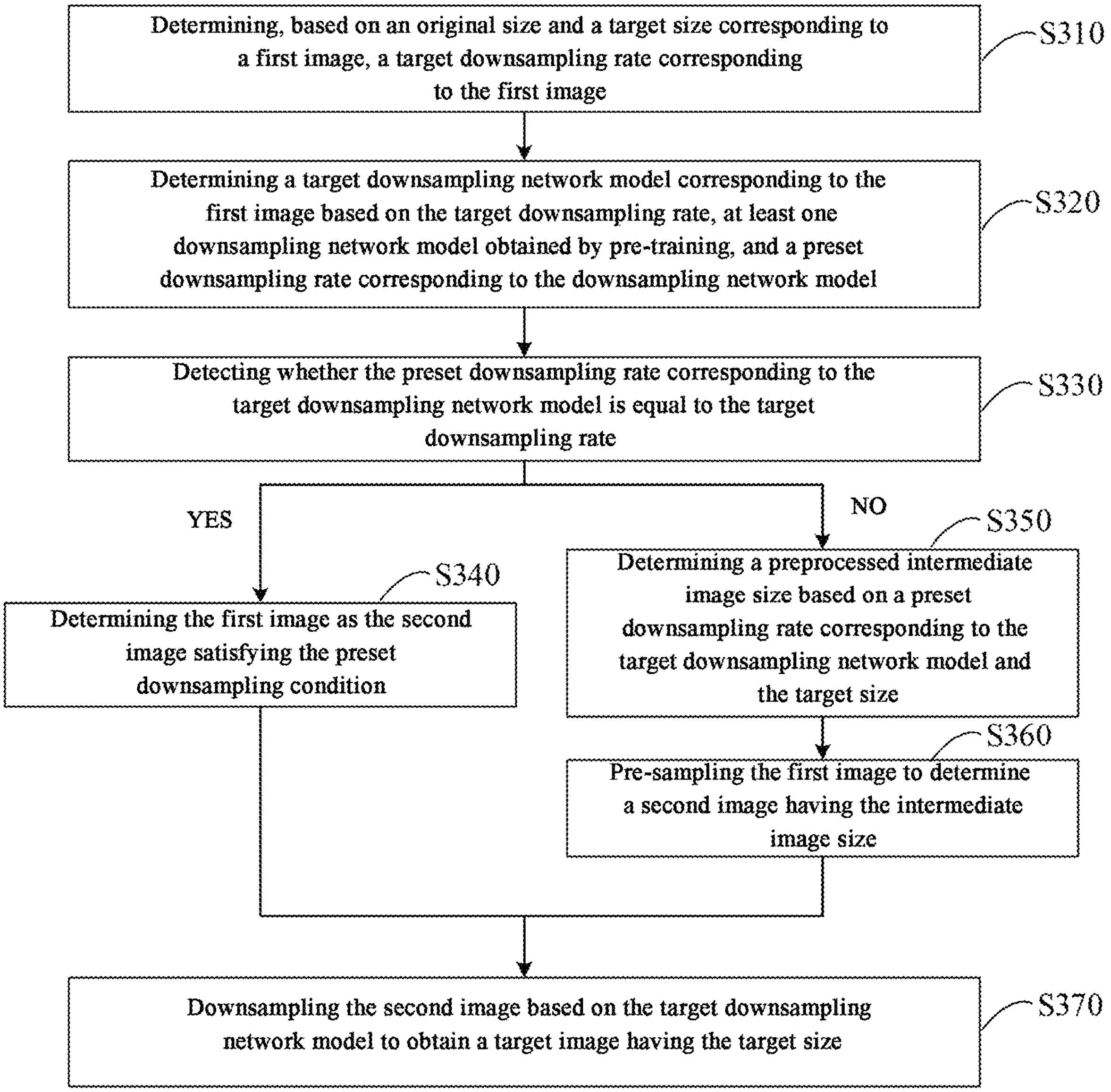
FIG. 3 illustrates an example of a training procedure of a downsampling network model involved in the embodiments of the present disclosure.

FIG. 3 illustrates a schematic flowchart of another image processing method provided by embodiments of the present disclosure. Based on the above disclosed embodiments, the present disclosure optimizes the step of "pre-sampling the first image based on a preset downsampling rate corresponding to the target downsampling network model and the target size, to determine a second image satisfying a preset downsampling condition", wherein explanations of the terms identical to or similar to those in the above disclosed embodiments are not elaborated here.

According to FIG. 3, the image processing method specifically includes steps of:

S310: determining, based on an original size and a processed target size corresponding to a first image to be processed, a target downsampling rate corresponding to the first image.

S320: determining a target downsampling network model corresponding to the first image based on the target downsampling rate, at least one pre-trained and obtained downsampling network model and a preset downsampling rate corresponding to the downsampling network model.

S330: detecting whether the preset downsampling rate corresponding to the target downsampling network model is equal to the target downsampling rate; if yes, the method executes step S340; if not, the method performs step S350.

S340: determining the first image as the second image satisfying the preset downsampling condition and executing step S370.

Specifically, when the preset downsampling rate corresponding to the target downsampling network model is equal to the target downsampling rate, it indicates that the target downsampling network model may be directly used to perform the downsampling at the target downsampling rate. At this point, the first image may be determined as the second image satisfying the preset downsampling condition.

S350: determining a preprocessed intermediate image size based on a preset downsampling rate corresponding to the target downsampling network model and the target size.

Wherein the intermediate image size may be an image size satisfying the preset downsampling condition.

To be specific, when the preset downsampling rate corresponding to the target downsampling network model is not equal to the target downsampling rate, it indicates that the downsampling at the target downsampling rate could not be executed directly by the target downsampling network model. In such case, the intermediate image size satisfying the preset downsampling condition may be determined based on the preset downsampling rate corresponding to the target downsampling network model and the target size.

As an example, S350 may include: multiplying the target size and a preset downsampling rate corresponding to the target downsampling network model and regarding a resulting multiplication result as a preprocessed intermediate image size.

To be specific, if the target size after downsampling includes height $H_t$ and width $W_t$ and the preset downsampling rate corresponding to the target downsampling network model is N, the preprocessed intermediate image size is $H_t \times N$ and $W_t \times N$ or round($H_t \times N$) and round($W_t \times N$), such that the target size may be obtained from downsampling the intermediate image size at N power.

S360: pre-sampling the first image to determine a second image having the intermediate image size and executing step S370.

Specifically, with image interpolation, such as bicubic interpolation, orthogonal similarity transformation Lanczos method, nearest neighbor interpolation, bilinear interpolation and the like, the first image is pre-upsampled or pre-downsampled to obtain a second image having the intermediate image size.

It is to be noted that the intermediate image size may be greater than or small than the original size of the first image. Where the intermediate image size is greater than the original size of the first image, the first image is pre-upsampled based on the image interpolation to obtain a second image having the intermediate image size. Where the intermediate image size is smaller than the original size of the first image, the first image is pre-downsampled based on the image interpolation to obtain a second image having the intermediate image size.

S370: downsampling the second image based on the target downsampling network model to obtain a target image having the target size.

According to the technical solution of the embodiments of the present disclosure, when the preset downsampling rate corresponding to the target downsampling network model is not equal to the target downsampling rate, the pre-processed intermediate image size is determined based on the preset downsampling rate corresponding to the target downsampling network model and the target size; and the first image is pre-sampled to determine a second image having the intermediate image size. Therefore, the first image may be downsampled to the target size through the combination of the pre-sampling and the target downsampling network model, and the image may be downsampled to any size while the quality of the downsampled image is guaranteed.

Figure 4:
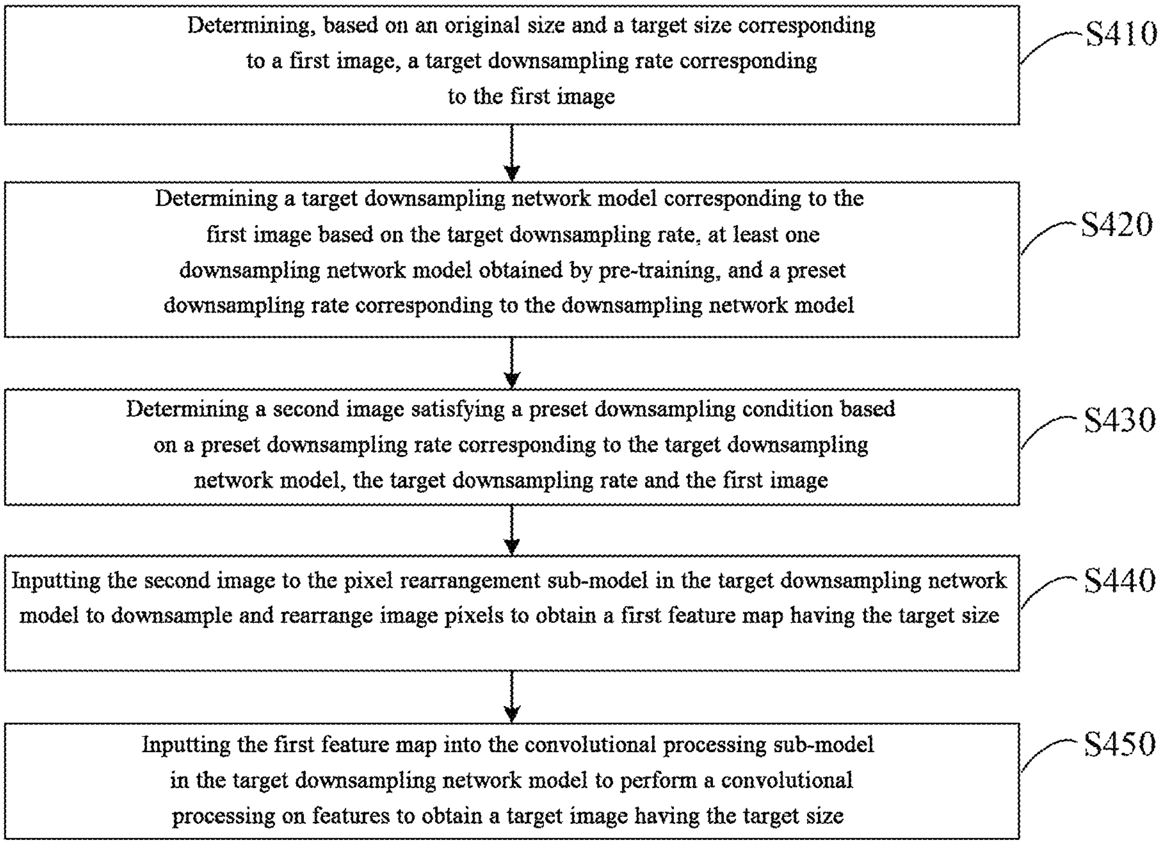
FIG. 4 illustrates a schematic flowchart of a further image processing method provided by embodiments of the present disclosure.

FIG. 4 illustrates a schematic flowchart of a further image processing method provided by embodiments of the present disclosure. Based on the above disclosed embodiments, the present disclosure describes the details of the specific architecture of the target downsampling network model, where explanations of the terms identical to or similar to those in the above disclosed embodiments are not elaborated here.

As shown in FIG. 4, the image processing method specifically includes steps of:

S410: determining, based on an original size and a processed target size corresponding to a first image to be processed, a target downsampling rate corresponding to the first image.

S420: determining a target downsampling network model corresponding to the first image based on the target downsampling rate, at least one pre-trained and obtained downsampling network model and a preset downsampling rate corresponding to the downsampling network model.

S430: determining a second image satisfying a preset downsampling condition based on a preset downsampling rate corresponding to the target downsampling network model, the target downsampling rate and the first image.

S440: inputting the second image to the pixel rearrangement sub-model in the target downsampling network model to downsample and rearrange image pixels, so as to obtain a first feature map having the target size.

Where the pixel rearrangement sub-model may be a network module provided to rearrange and reorganize image pixels to implement image downsampling. The network architecture of the pixel rearrangement sub-model varies depending on the preset downsampling rate being an integer rate or a fractional rate. Different integer rates correspond to the same network architecture of the pixel rearrangement sub-model, and various fractional rates also correspond to the same network architecture of the pixel rearrangement sub-model. The first feature map may indicate a feature image having the same size as the target image.

Specifically, the pixel rearrangement sub-model in the target downsampling network model may downsample and rearrange image pixels of the input second image (i.e., downsampling the second image at the preset downsampling rate), to obtain the first feature map having the target size. It is to be noted that when the image is downsampled using the pixel rearrangement sub-model, the occupied video memory remains unchanged, no additional video memory is taken and efficiency and stability of the image processing are improved. The first feature map has the same width and height as the target image, but differs in the channel number.

Figure 5:
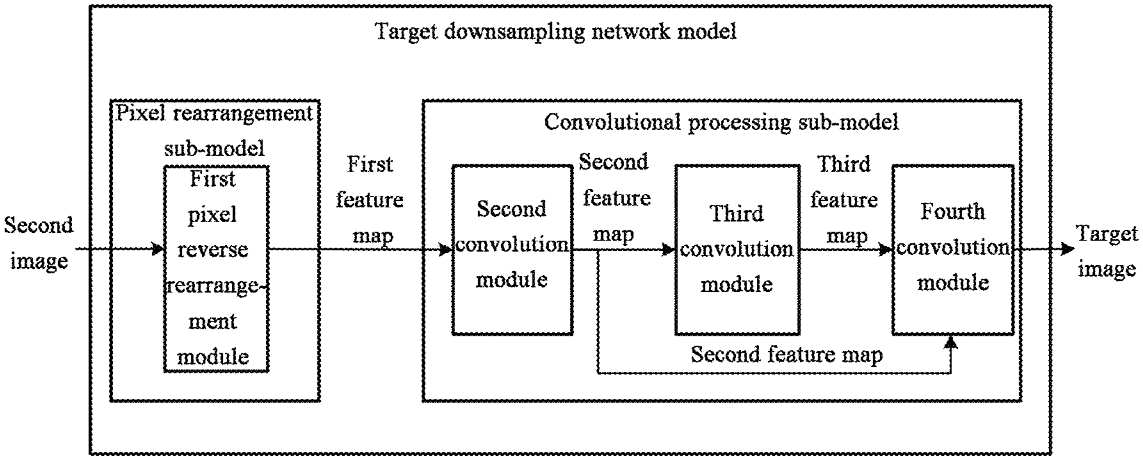
FIG. 5 illustrates an example of architecture of a target downsampling network model in case that a preset downsampling rate is an integer rate according to the embodiments of the present disclosure.

As an example, with reference to FIG. 5, when the preset downsampling rate corresponding to the target downsampling network model is an integer rate, the pixel rearrangement sub-model includes: a first pixel reverse rearrangement model. The first pixel reverse rearrangement module may implement the image downsampling by increasing the number of channels and reducing the spatial resolution. For instance, the first pixel reverse rearrangement module may be Pixel Unshuffle layer.

Wherein a channel amplification factor in the first pixel reverse rearrangement model is equal to the preset downsampling rate corresponding to the target downsampling network model. For example, the first pixel reverse rearrangement module may rearrange an image $(C, H\times r_1, W\times r_1)$ into a feature map $(C\times r_1^2, H, W)$ to increase the number of channels and reduce the spatial resolution without altering the occupied video memory. The channel amplification factor r1 is equal to the preset downsampling rate corresponding to the target downsampling network model.

To be specific, according to FIG. 5, when the preset downsampling rate corresponding to the target downsampling network model is an integer rate, S440 may include: inputting the second image to the first pixel reverse rearrangement module to downsample and rearrange image pixels, so as to obtain a first feature map having the target size.

Figure 6:
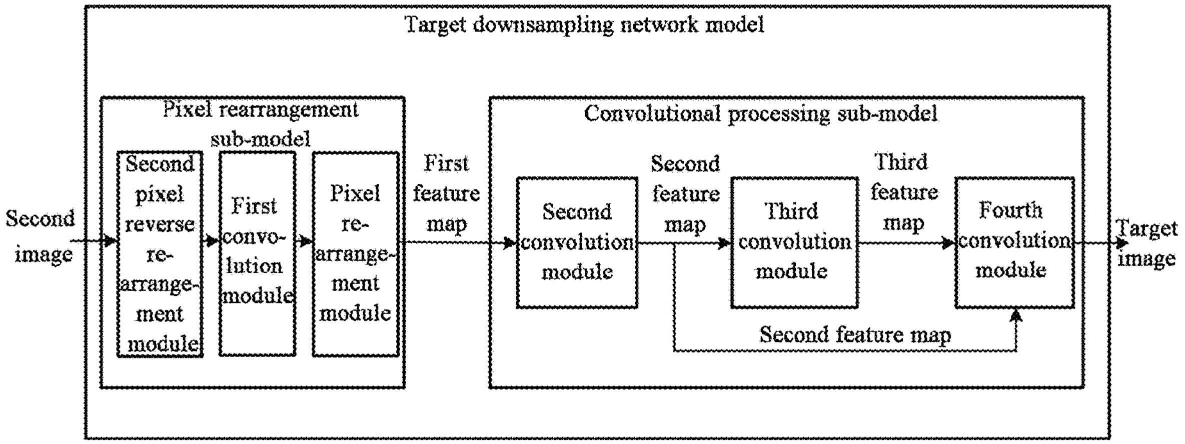
FIG. 6 an example of architecture of a target downsampling network model in case that a preset downsampling rate is a fractional rate according to the embodiments of the present disclosure.

As an example, in FIG. 6, when the preset downsampling rate corresponding to the target downsampling network model is a fractional rate, the pixel rearrangement sub-model includes: a second pixel reverse rearrangement model, a first convolution module and a pixel rearrangement module; wherein the second pixel reverse rearrangement module may implement image downsampling through increasing the number of channels and reducing the spatial resolution. The first convolution module may perform a convolutional processing on the feature map output by the second pixel reverse rearrangement module, to enhance the quality of the downsampled image. For instance, the first convolution module may include a 3×3 convolution kernel with a step size of 1 and filled with a convolution layer with padding being 1. The pixel rearrangement module may upsample the image by decreasing the number of channels and increasing the spatial resolution. For instance, the pixel rearrangement module may be Pixel shuffle layer. The pixel reverse rearrangement module and the pixel rearrangement module are inverse operations of each other. The pixel rearrangement module may rearrange an image $(C\times r_3^2, H, W)$ into a feature map $(C, H\times r_3, W\times r_3)$ to reduce the number of channels and increase the spatial resolution while the occupied video memory remains the same.

Wherein the channel amplification factor $r_2$ in the second pixel reverse rearrangement module and the channel reduction factor $r_3$ in the pixel rearrangement module are determined according to the preset downsampling rate corresponding to the target downsampling network model. Specifically, when the preset downsampling rate corresponding to the target downsampling network model is a fractional rate, such as X/Y, it is determined that the numerator X is the channel amplification factor $r_2$ in the second pixel reverse rearrangement module and the denominator Y is the channel reduction factor $r_3$ in the pixel rearrangement module. The downsampling at the fractional rate may be fulfilled by combining the second pixel reverse rearrangement module with the pixel rearrangement module.

To be specific, according to FIG. 6, when the preset downsampling rate corresponding to the target downsampling network model is a fractional rate, S440 may include: inputting the second image into the second pixel reverse rearrangement module to downsample and rearrange the image pixels, thereby obtaining the downsampled feature map; inputting the downsampled feature map into the first convolution module for convolutional processing to obtain a post-convolution feature map; inputting the post-convolution feature map into the pixel rearrangement module to upsample and rearrange the pixels, thereby obtaining an upsampled first feature map. The downsampling at the fractional rate is thus implemented.

S450: inputting the first feature map into the convolutional processing sub-model in the target downsampling network model to perform a convolutional processing on features, so as to obtain a target image having the target size.

Wherein the convolutional processing sub-model is a network model that performs the convolutional processing on the feature map, to ensure the quality of image processing. For example, the convolutional processing sub-model may include one or more convolution layers. The use of multiple convolution layers may further ensure the quality of image processing.

Specifically, the convolutional processing sub-model in the target downsampling network model performs the convolutional processing on the input feature map in the aspect of depth feature, so as to obtain the target image of better quality and target size. This effectively ensures the image quality after downsampling.

As an example, with reference to FIG. 5 or 6, the convolutional processing sub-model may include: a second convolution module, a third convolution module and a fourth convolution module. The second, third and fourth convolution modules may each include one or more convolution layers. The second, third and fourth convolution modules are respectively located at different positions to perform the convolutional processing, so as to further enhance the effects of the convolutional processing.

For example, the second convolution module and the fourth convolution module each may include a 3×3 convolution kernel with a step size of 1 and filled with a convolution layer with padding being 1. The third convolution module may include three 3×3 convolution kernels with a step size of 1 and filled with a convolution layer with padding being 1. The second convolution module and the third convolution module also include an activation function layer, such as LeakyReLU activation function layer with a negative axis slope of 0.2. The fourth convolution module is free of the activation function layer to avoid restrictions over expressiveness. The fourth convolution module may have three output channels, i.e., the output target image is an RGB image with three channels.

As an example, referring to FIG. 5 or 6, S450 may include: inputting the first feature map into the second convolution layer for convolutional processing, so as to obtain a processed second feature map; inputting the second feature map into the third convolution layer for convolutional processing, so as to obtain a processed third feature map; inputting the second feature map and the third feature map into the fourth convolution layer for convolutional processing, so as to obtain a target image having the target size. Wherein the second feature map and the third feature map may be superimposed and the superimposed feature map is input to the fourth convolution layer for convolutional processing, to obtain the target image of the target size.

For example, according to FIG. 5, in case that the preset downsampling rate corresponding to the target downsampling network model is 2, i.e., an integer rate, the second image having a size of (3,1080,1920) is input to the first pixel reverse rearrangement module (having a channel amplification factor $r_1$=2) to produce the first feature map having a size of (12,540,960). The first feature map is input to the second convolution module to produce the second feature map having a size of (16,540,960). The second feature map is input to the third convolution module to produce the third feature map having a size of (16,540,960). The second and third feature maps are superimposed and then input to the fourth convolution module to produce the target image having a size of (3,540,960). Therefore, the second image having a size of (1080,1920) is downsampled by 2 times to obtain the target image having a size of (540,960).

For instance, as shown in FIG. 6, in case that the preset downsampling rate corresponding to the target downsampling network model is 1.5, i.e., a fractional rate, the second image having a size of (3, 1080, 1920) is input to the second pixel reverse rearrangement module (having channel amplification factor $r_2$=3) to produce the feature map having a size of (27,360,640). The feature map is input to the first convolution module to produce the feature map having a size of (36,360,640). The feature map is input to the pixel rearrangement module (having channel reduction factor $r_3$=2) to produce the first feature map having a size of (9,720,1080). The first feature map is input to the second convolution module to produce the second feature map having a size of (9,720,1080). The second feature map is input to the third convolution module to produce the third feature map having a size of (9,720,1280). The second and third feature maps are superimposed and then input to the fourth convolution module to produce the target image having a size of (3,720, 1280). Therefore, the second image having a size of (1080, 1920) is downsampled by 1.5 times to obtain the target image having a size of (720,1280).

The technical solution according to embodiments of the present disclosure downsamples and rearranges the image pixels of the second image and performs a convolutional processing on the features using the pixel rearrangement sub-model and the convolutional processing sub-model, such that the occupied video memory remains the same, no additional video memory is taken and the efficiency and stability of the image processing are improved while the downsampling at the preset downsampling rate is fulfilled.

Figure 7:
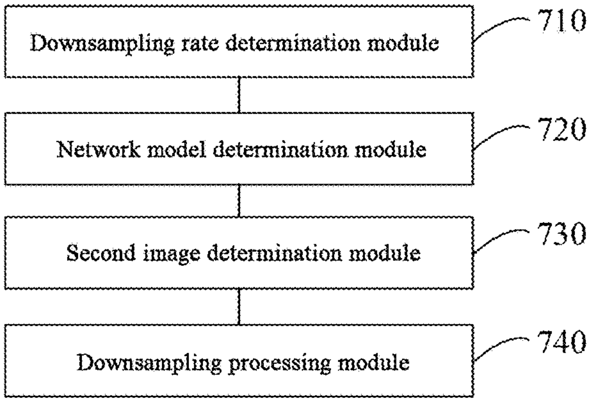
FIG. 7 illustrates a structural diagram of an image processing apparatus provided by embodiments of the present disclosure.

FIG. 7 illustrates a structural diagram of an image processing apparatus provided by embodiments of the present disclosure. As shown in FIG. 7, the apparatus specifically includes: a downsampling rate determination module 710, a network model determination module 720, a second image determination module 730 and a downsampling processing module 740.

Wherein the downsampling rate determination module 710 determines, based on an original size and a processed target size corresponding to a first image to be processed, a target downsampling rate corresponding to the first image; the network model determination module 720 determines a target downsampling network model corresponding to the first image based on the target downsampling rate, at least one pre-trained and obtained downsampling network model and a preset downsampling rate corresponding to the downsampling network model; the second image determination module 730 determines a second image satisfying a preset downsampling condition based on a preset downsampling rate corresponding to the target downsampling network model, the target downsampling rate and the first image; the downsampling processing module 740 downsamples the second image based on the target downsampling network model to obtain a target image having the target size.

The technical solution provided by the embodiments of the present disclosure determines, based on an original size and a processed target size corresponding to a first image to be processed, a target downsampling rate corresponding to the first image; determines, from at least one downsampling network model, a target downsampling network model corresponding to the first image based on the target downsampling rate, at least one pre-trained and obtained downsampling network model and a preset downsampling rate corresponding to the downsampling network model; determines a second image satisfying a preset downsampling condition based on a preset downsampling rate corresponding to the target downsampling network model, the target downsampling rate and the first image. As a result, the target downsampling network model is directly used to downsample the second image at the corresponding preset downsampling rate, so as to obtain the target image having the target size. As the pre-trained target downsampling network model conducts a deep learning of the downsampling treatment, the image quality after the downsampling may be improved. Besides, by determining a matching target downsampling network model and a second image satisfying the preset downsampling condition, the image may be downsampled to any size and the flexibility of image downsampling is enhanced.

On the basis of the above respective technical solutions, the network model determination module 720 is provided specifically for:

determining a rate difference between the target downsampling rate and a preset downsampling rate corresponding to each pre-trained and obtained downsampling network model; determining, based on the rate difference corresponding to each downsampling network model, a target downsampling network model corresponding to the first image.

On the basis of the above respective technical solutions, the second image determination module 730 includes:

a first determination unit for determining the first image as a second image satisfying a preset downsampling condition if a preset downsampling rate corresponding to the target downsampling network model is equal to the target downsampling rate;

a second determination unit for, if a preset downsampling rate corresponding to the target downsampling network model is not equal to the target downsampling rate, pre-sampling the first image based on a preset downsampling rate corresponding to the target downsampling network model and the target size, to determine a second image satisfying a preset downsampling condition.

On the basis of the above respective technical solutions, the second determination unit includes:

an intermediate image size determination sub-unit for determining a preprocessed intermediate image size based on a preset downsampling rate corresponding to the target downsampling network model and the target size;

a second image determination sub-unit for pre-sampling the first image to determine a second image having the intermediate image size.

On the basis of the above respective technical solutions, the intermediate image size determination sub-unit is provided specifically for:

multiplying the target size and a preset downsampling rate corresponding to the target downsampling network model and regarding a resulting multiplication result as a preprocessed intermediate image size.

On the basis of the above respective technical solutions, the target downsampling network model includes: a pixel rearrangement sub-model and a convolutional processing sub-model;

The downsampling processing module 740 includes:

a downsampling rearrangement unit for inputting the second image to the pixel rearrangement sub-model to downsample and rearrange image pixels, so as to obtain a first feature map having the target size;

a convolutional processing unit for inputting the first feature map into the convolutional processing sub-model to perform a convolutional processing on features, so as to obtain a target image having the target size.

On the basis of the above respective technical solutions, when a preset downsampling rate corresponding to the target downsampling network model is an integer rate, the pixel rearrangement sub-model includes: a first pixel reverse rearrangement model;

wherein a channel amplification factor in the first pixel reverse rearrangement model is equal to a preset downsampling rate corresponding to the target downsampling network model.

On the basis of the above respective technical solutions, when a preset downsampling rate corresponding to the target downsampling network model is a fractional rate, the pixel rearrangement sub-model includes: a second pixel reverse rearrangement model, a first convolution module and a pixel rearrangement module;

wherein a channel amplification factor in the second pixel reverse rearrangement module and a channel reduction factor in the pixel rearrangement module are determined according to a preset downsampling rate corresponding to the target downsampling network model.

On the basis of the above respective technical solutions, the convolutional processing sub-model includes: a second convolution module, a third convolution module and a fourth convolution module;

The convolutional processing unit is specifically provided for: inputting the first feature map into the second convolution layer for convolutional processing, so as to obtain a processed second feature map; inputting the second feature map into the third convolution layer for convolutional processing, so as to obtain a processed third feature map; inputting the second feature map and the third feature map into the fourth convolution layer for convolutional processing, so as to obtain a target image having the target size.

On the basis of the above respective technical solutions, the apparatus also comprises:

A downsampling network model training module for upsampling a sample image at a preset downsampling rate corresponding to a downsampling network model as an upsampling rate, to obtain an upsampled image; inputting the upsampled image to a downsampling network model to be trained for downsampling, so as to obtain an output image of a downsampling network model; determining a training error based on the output image and the sample image, and propagating the training error back to a downsampling network model to be trained for network parameter adjustment; and determining that training of a downsampling network model is finished until a preset convergence condition is reached.

The image processing apparatus provided by the embodiments of the present disclosure can execute the image processing method according to any embodiments of the present disclosure. The apparatus includes corresponding functional modules for executing the image processing method and achieves advantageous effects.

It is to be noteworthy that the respective units and modules included in the above apparatus are divided only by functional logic. The units and modules may also be divided in other ways as long as they can fulfill the corresponding functions. Further, the names of the respective functional units are provided only to distinguish one from another, rather than restricting the protection scope of the embodiments of the present disclosure.

Figure 8:
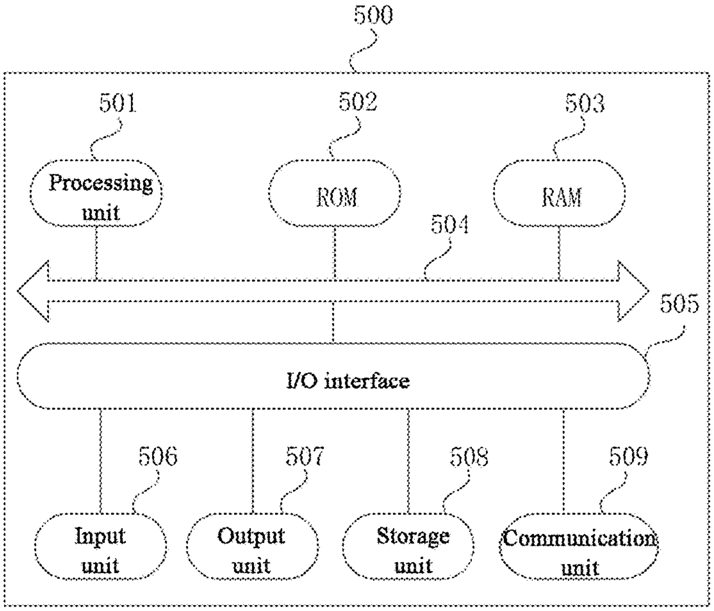
FIG. 8 illustrates a structural diagram of an electronic device provided by the embodiments of the present disclosure.

FIG. 8 illustrates a structural diagram of an electronic device provided by the embodiments of the present disclosure. With reference to FIG. 8, a structural diagram of an electronic device (e.g., terminal device or server in FIG. 8) 500 adapted to implement embodiments of the present disclosure is shown. In the embodiments of the present disclosure, the terminal device may include, but not limited to, mobile terminals, such as mobile phones, notebooks, digital broadcast receivers, PDAs (Personal Digital Assistant), PADs (tablet computer), PMPs (Portable Multimedia Player) and vehicle terminals (such as car navigation terminal) and fixed terminals, e.g., digital TVs and desktop computers etc. The electronic device shown in FIG. 8 is just an example and will not restrict the functions and application ranges of the embodiments of the present disclosure.

According to FIG. 8, the electronic device 500 may include a processor (e.g., central processor, graphic processor and the like) 501, which can execute various suitable actions and processing based on the programs stored in the read-only memory (ROM) 502 or programs loaded in the random-access memory (RAM) 503 from a storage unit 508. The RAM 503 can also store all kinds of programs and data required by the operations of the electronic device 500. Processor 501, ROM 502 and RAM 503 are connected to each other via a bus 504. The input/output (I/O) interface 505 is also connected to the bus 504.

Usually, input unit 506 (including touch screen, touchpad, keyboard, mouse, camera, microphone, accelerometer, gyroscope and like) and output unit 507 (including liquid crystal display (LCD), speaker and vibrator etc.), storage unit 508 (including tape and hard disk etc.) and communication unit 509 may be connected to the I/O interface 505. The communication unit 509 may allow the electronic device 500 to exchange data with other devices through wired or wireless communications. Although FIG. 8 illustrates the electronic device 500 having various units, it is to be understood that it is not a prerequisite to implement or provide all illustrated units. Alternatively, more or less units may be implemented or provided.

In particular, in accordance with embodiments of the present disclosure, the process depicted above with reference to the flowchart may be implemented as computer software programs. For example, the embodiments of the present disclosure include a computer program product including computer programs carried on a non-transient computer readable medium, wherein the computer programs include program codes for executing the method demonstrated by the flowchart. In these embodiments, the computer programs may be loaded and installed from networks via the communication unit 509, or installed from the storage unit 508, or installed from the ROM 502. The computer programs, when executed by the processor 501, performs the above functions defined in the method for video editing according to the embodiments of the present disclosure.

Names of the messages or information exchanged between a plurality of apparatuses in the implementations of the present disclosure are provided only for explanatory purpose, rather than restricting the scope of the messages or information.

The electronic device provided by the embodiments of the present disclosure and the image processing method according to the above embodiments belong to the same inventive concept. The technical details not elaborated in these embodiments may refer to the above embodiments. Besides, these embodiments and the above embodiments achieve the same advantageous effects.

Embodiments of the present disclosure provide a computer storage medium on which computer programs are stored, which programs when executed by a processor implement the image processing method provided by the above embodiments.

It is to be explained the above disclosed computer readable medium may be computer readable signal medium or computer readable storage medium or any combinations thereof. The computer readable storage medium for example may include, but not limited to, electric, magnetic, optical, electromagnetic, infrared or semiconductor systems, apparatus or devices or any combinations thereof. Specific examples of the computer readable storage medium may include, but not limited to, electrical connection having one or more wires, portable computer disk, hard disk, random access memory (RAM), read-only memory (ROM), erasable programmable read only memory (EPROM or flash memory), fiber optics, portable compact disk read only memory (CD-ROM), optical storage device, magnetic storage device, or any suitable combinations thereof. In the present disclosure, the computer readable storage medium may be any tangible medium that contains or stores programs. The programs may be utilized by instruction execution systems, apparatuses or devices in combination with the same. In the present disclosure, the computer readable signal medium may include a data signal propagated in baseband or as part of a carrier wave, carrying computer readable program codes therein. Such propagated data signals may take many forms, including but not limited to, electromagnetic signals, optical signals, or any suitable combinations thereof. The computer readable signal medium may also be any computer readable medium in addition to the computer readable storage medium. The computer readable signal medium may send, propagate, or transmit programs for use by or in connection with instruction execution systems, apparatuses or devices. Program codes contained on the computer readable medium may be transmitted by any suitable media, including but not limited to: electric wires, fiber optic cables and RF (radio frequency) etc., or any suitable combinations thereof.

In some implementations, clients and servers may communicate with each other via any currently known or to be developed network protocols, such as HTTP (HyperText Transfer Protocol) and interconnect with digital data communications in any forms or media (such as communication networks). Examples of the communication networks include Local Area Network (LAN), Wide Area Network (WAN), internet work (e.g., Internet) and end-to-end network (such as ad hoc end-to-end network), and any currently known or to be developed networks.

The above computer readable medium may be included in the aforementioned electronic device or stand-alone without fitting into the electronic device. The above computer readable medium bears one or more programs. When the above one or more programs are executed by the electronic device, the electronic device is enabled to: determine, based on an original size and a processed target size corresponding to a first image to be processed, a target downsampling rate corresponding to the first image; determine a target downsampling network model corresponding to the first image based on the target downsampling rate, at least one pre-trained and obtained downsampling network model and a preset downsampling rate corresponding to the downsampling network model; determine a second image satisfying a preset downsampling condition based on a preset downsampling rate corresponding to the target downsampling network model, the target downsampling rate and the first image; and downsample the second image based on the target downsampling network model to obtain a target image having the target size.

Computer program instructions for executing operations of the present disclosure may be written in one or more programming languages or combinations thereof. The above programming languages include, but not limited to, object-oriented programming languages, e.g., Java, Smalltalk, C++ and so on, and traditional procedural programming languages, such as "C" language or similar programming languages. The program codes can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider).

The flow chart and block diagram in the drawings illustrate system architecture, functions and operations that may be implemented by system, method and computer program product according to various implementations of the present disclosure. In this regard, each block in the flow chart or block diagram can represent a module, a part of program segment or code, wherein the module and the part of program segment or code include one or more executable instruction for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Units described in the embodiments of the present disclosure may be implemented by software or hardware. In some cases, the name of the unit should not be considered as the restriction over the unit per se. For example, a first obtaining unit also may be described as "a unit for obtaining at least two Internet protocol addresses".

The functionality described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

In the context of the present disclosure, machine readable medium may be tangible medium that may include or store programs for use by or in connection with instruction execution systems, apparatuses or devices. The machine readable medium may be machine readable signal medium or machine readable storage medium. The machine readable storage medium for example may include, but not limited to, electric, magnetic, optical, electromagnetic, infrared or semiconductor systems, apparatus or devices or any combinations thereof. Specific examples of the machine readable storage medium may include, but not limited to, electrical connection having one or more wires, portable computer disk, hard disk, random access memory (RAM), read-only memory (ROM), erasable programmable read only memory (EPROM or flash memory), fiber optics, portable compact disk read only memory (CD-ROM), optical storage device, magnetic storage device, or any suitable combinations thereof.

In accordance with one or more embodiments of the present disclosure, Example 1 provides an image processing method, comprising:

determining, based on an original size and a processed target size corresponding to a first image to be processed, a target downsampling rate corresponding to the first image;

determining a target downsampling network model corresponding to the first image based on the target downsampling rate, at least one pre-trained and obtained downsampling network model and a preset downsampling rate corresponding to the downsampling network model;

determining a second image satisfying a preset downsampling condition based on a preset downsampling rate corresponding to the target downsampling network model, the target downsampling rate and the first image;

downsampling the second image based on the target downsampling network model to obtain a target image having the target size.

In accordance with one or more embodiments of the present disclosure, Example 2 provides an image processing method, also comprising:

optionally, the determining a target downsampling network model corresponding to the first image based on the target downsampling rate, at least one pre-trained and obtained downsampling network model and a preset downsampling rate corresponding to the downsampling network model includes:

determining a rate difference between the target downsampling rate and a preset downsampling rate corresponding to each pre-trained and obtained downsampling network model;

determining, based on the rate difference corresponding to each downsampling network model, a target downsampling network model corresponding to the first image.

In accordance with one or more embodiments of the present disclosure, Example 3 provides an image processing method, also comprising:

optionally, the determining a second image satisfying a preset downsampling condition based on a preset downsampling rate corresponding to the target downsampling network model, the target downsampling rate and the first image includes:

if a preset downsampling rate corresponding to the target downsampling network model is equal to the target downsampling rate, determining the first image as a second image satisfying a preset downsampling condition;

if a preset downsampling rate corresponding to the target downsampling network model is not equal to the target downsampling rate, pre-sampling the first image based on a preset downsampling rate corresponding to the target downsampling network model and the target size, to determine a second image satisfying a preset downsampling condition.

In accordance with one or more embodiments of the present disclosure, Example 4 provides an image processing method, also comprising:

optionally, the pre-sampling the first image based on a preset downsampling rate corresponding to the target downsampling network model and the target size, to determine a second image satisfying a preset downsampling condition, includes:

determining a preprocessed intermediate image size based on a preset downsampling rate corresponding to the target downsampling network model and the target size;

pre-sampling the first image to determine a second image having the intermediate image size.

In accordance with one or more embodiments of the present disclosure, Example 5 provides an image processing method, also comprising:

optionally, the determining a preprocessed intermediate image size based on a preset downsampling rate corresponding to the target downsampling network model and the target size includes:

multiplying the target size and a preset downsampling rate corresponding to the target downsampling network model and regarding a resulting multiplication result as a preprocessed intermediate image size.

In accordance with one or more embodiments of the present disclosure, Example 6 provides an image processing method, also comprising:

optionally, the target downsampling network model includes: a pixel rearrangement sub-model and a convolutional processing sub-model;

the downsampling the second image based on the target downsampling network model to obtain a target image having the target size includes:

inputting the second image to the pixel rearrangement sub-model to downsample and rearrange image pixels, so as to obtain a first feature map having the target size;

inputting the first feature map into the convolutional processing sub-model to perform a convolutional processing on features, so as to obtain a target image having the target size.

In accordance with one or more embodiments of the present disclosure, Example 7 provides an image processing method, also comprising:

optionally, when a preset downsampling rate corresponding to the target downsampling network model is an integer rate, the pixel rearrangement sub-model includes: a first pixel reverse rearrangement model;

wherein a channel amplification factor in the first pixel reverse rearrangement model is equal to a preset downsampling rate corresponding to the target downsampling network model.

In accordance with one or more embodiments of the present disclosure, Example 8 provides an image processing method, also comprising:

optionally, when a preset downsampling rate corresponding to the target downsampling network model is a fractional rate, the pixel rearrangement sub-model includes: a second pixel reverse rearrangement model, a first convolution module and a pixel rearrangement module;

wherein a channel amplification factor in the second pixel reverse rearrangement module and a channel reduction factor in the pixel rearrangement module are determined according to a preset downsampling rate corresponding to the target downsampling network model.

In accordance with one or more embodiments of the present disclosure, Example 9 provides an image processing method, also comprising:

optionally, the convolutional processing sub-model includes: a second convolution module, a third convolution module and a fourth convolution module;

the inputting the first feature map into the convolutional processing sub-model to perform a convolutional processing on features, so as to obtain a target image having the target size includes:

inputting the first feature map into the second convolution layer for convolutional processing, so as to obtain a processed second feature map;

inputting the second feature map into the third convolution layer for convolutional processing, so as to obtain a processed third feature map;

inputting the second feature map and the third feature map into the fourth convolution layer for convolutional processing, so as to obtain a target image having the target size.

In accordance with one or more embodiments of the present disclosure, Example 10 provides an image processing method, also comprising:

optionally, a training procedure of each downsampling network model includes:

upsampling a sample image at a preset downsampling rate corresponding to a downsampling network model as an upsampling rate, to obtain an upsampled image;

inputting the upsampled image to a downsampling network model to be trained for downsampling, so as to obtain an output image of a downsampling network model;

determining a training error based on the output image and the sample image, and propagating the training error back to a downsampling network model to be trained for network parameter adjustment; and determining that training of a downsampling network model is finished until a preset convergence condition is reached.

In accordance with one or more embodiments of the present disclosure, Example 11 provides an image processing apparatus, comprising:

a downsampling rate determination module for determining, based on an original size and a processed target size corresponding to a first image to be processed, a target downsampling rate corresponding to the first image;

a network model determination module for determining a target downsampling network model corresponding to the first image based on the target downsampling rate, at least one pre-trained and obtained downsampling network model and a preset downsampling rate corresponding to the downsampling network model;

a second image determination module for determining a second image satisfying a preset downsampling condition based on a preset downsampling rate corresponding to the target downsampling network model, the target downsampling rate and the first image;

a downsampling processing module for downsampling the second image based on the target downsampling network model to obtain a target image having the target size.

The above description only explains the preferred embodiments of the present disclosure and the technical principles applied. Those skilled in the art should understand that the scope of the present disclosure is not limited to the technical solution resulted from particular combinations of the above technical features, and meanwhile should also encompass other technical solutions formed from any combinations of the above technical features or equivalent features without deviating from the above disclosed inventive concept, such as the technical solutions formed by substituting the above features with the technical features disclosed here with similar functions.

Furthermore, although the respective operations are depicted in a particular order, it should be appreciated that the operations are not required to be completed in the particular order or in succession. In some cases, multitasking or multiprocessing is also beneficial. Likewise, although the above discussion comprises some particular implementation details, they should not be interpreted as limitations over the scope of the present disclosure. Some features described separately in the context of the embodiments of the description can also be integrated and implemented in a single embodiment. Conversely, all kinds of features described in the context of a single embodiment can also be separately implemented in multiple embodiments or any suitable subcombinations.

Although the subject matter is already described by languages specific to structural features and/or method logic acts, it is to be appreciated that the subject matter defined in the attached claims is not limited to the above described particular features or acts. On the contrary, the above described particular features and acts are only example forms for implementing the claims.

We claim:

1. An image processing method, comprising:

determining, based on an original size and a target size corresponding to a first image, a target downsampling rate corresponding to the first image;

determining a target downsampling network model corresponding to the first image based on the target downsampling rate, at least one downsampling network model obtained by pre-training, and a preset downsampling rate corresponding to the downsampling network model;

determining a second image satisfying a preset downsampling condition based on a preset downsampling rate corresponding to the target downsampling network model, the target downsampling rate and the first image; and downsampling the second image based on the target downsampling network model to obtain a target image with the target size.

2. The image processing method of claim 1, wherein determining a target downsampling network model corresponding to the first image based on the target downsampling rate, at least one downsampling network model obtained by pre-training, and a preset downsampling rate corresponding to the downsampling network model comprises:

determining a rate difference between the target downsampling rate and a preset downsampling rate corresponding to each downsampling network model obtained by pre-training; and determining, based on the rate difference corresponding to each downsampling network model, a target downsampling network model corresponding to the first image.

3. The image processing method of claim 1, wherein determining a second image satisfying a preset downsampling condition based on a preset downsampling rate corresponding to the target downsampling network model, the target downsampling rate and the first image comprises:

in response to that a preset downsampling rate corresponding to the target downsampling network model is equal to the target downsampling rate, determining the first image as the second image satisfying a preset downsampling condition; and in response to that a preset downsampling rate corresponding to the target downsampling network model is not equal to the target downsampling rate, pre-sampling the first image based on a preset downsampling rate corresponding to the target downsampling network model and the target size, to determine the second image satisfying a preset downsampling condition.

4. The image processing method of claim 3, wherein the pre-sampling the first image based on a preset downsampling rate corresponding to the target downsampling network model and the target size, to determine a second image satisfying a preset downsampling condition, comprises:

determining an intermediate image size based on a preset downsampling rate corresponding to the target downsampling network model and the target size; and pre-sampling the first image to determine the second image with the intermediate image size.

5. The image processing method of claim 4, wherein determining a intermediate image size based on a preset downsampling rate corresponding to the target downsampling network model and the target size comprises:

multiplying the target size with a preset downsampling rate corresponding to the target downsampling network model and determining the multiplication result as the intermediate image size.

6. The image processing method of claim 1, wherein the target downsampling network model comprises: a pixel rearrangement sub-model and a convolutional processing sub-model; and wherein the downsampling the second image based on the target downsampling network model to obtain a target image having the target size comprises:

inputting the second image to the pixel rearrangement sub-model to downsample and rearrange image pixels to obtain a first feature map with the target size; and inputting the first feature map to the convolutional processing sub-model and performing convolutional processing on features to obtain a target image having the target size.

7. The image processing method of claim 6, wherein, when a preset downsampling rate corresponding to the target downsampling network model is an integer rate, the pixel rearrangement sub-model comprises: a first pixel reverse rearrangement model; and wherein a channel amplification factor in the first pixel reverse rearrangement model is equal to a preset downsampling rate corresponding to the target downsampling network model.

8. The image processing method of claim 6, wherein, when a preset downsampling rate corresponding to the target downsampling network model is a fractional rate, the pixel rearrangement sub-model comprises: a second pixel reverse rearrangement model, a first convolution module and a pixel rearrangement module; and wherein a channel amplification factor in the second pixel reverse rearrangement module and a channel reduction factor in the pixel rearrangement module are determined according to a preset downsampling rate corresponding to the target downsampling network model.

9. The image processing method of claim 6, wherein the convolutional processing sub-model comprises: a second convolution module, a third convolution module and a fourth convolution module;

inputting the first feature map to the convolutional processing sub-model and performing convolutional processing on features to obtain a target image having the target size comprises:

inputting the first feature map to the second convolution layer for convolutional processing to obtain a processed second feature map;

inputting the second feature map to the third convolution layer for convolutional processing to obtain a processed third feature map; and inputting the second feature map and the third feature map into the fourth convolution layer for convolutional processing, so as to obtain a target image having the target size.

10. The image processing method according to claim 1, characterized in that, a training procedure of each downsampling network model comprises:

upsampling a sample image at a preset downsampling rate corresponding to a downsampling network model as an upsampling rate, to obtain an upsampled image;

inputting the upsampled image to a downsampling network model to be trained for downsampling, so as to obtain an output image of a downsampling network model; and determining a training error based on the output image and the sample image, and propagating the training error back to a downsampling network model to be trained for network parameter adjustment; and determining that training of a downsampling network model is finished until a preset convergence condition is reached.

11. An electronic device, comprising:

one or more processors; and a memory for storing one or more programs, wherein, when executed by the one or more processors, the one or more programs causing the one or more processors to:

determine, based on an original size and a target size corresponding to a first image, a target downsampling rate corresponding to the first image;

determine a target downsampling network model corresponding to the first image based on the target downsampling rate, at least one downsampling network model obtained by pre-training, and a preset downsampling rate corresponding to the downsampling network model;

determine a second image satisfying a preset downsampling condition based on a preset downsampling rate corresponding to the target downsampling network model, the target downsampling rate and the first image; and downsample the second image based on the target downsampling network model to obtain a target image with the target size.

12. The device of claim 11, wherein the one or more programs causing the one or more processors to determine a target downsampling network model corresponding to the first image based on the target downsampling rate, at least one downsampling network model obtained by pre-training, and a preset downsampling rate corresponding to the downsampling network model comprise instructions to:

determine a rate difference between the target downsampling rate and a preset downsampling rate corresponding to each downsampling network model obtained by pre-training; and determine, based on the rate difference corresponding to each downsampling network model, a target downsampling network model corresponding to the first image.

13. The device of claim 11, wherein the one or more programs causing the one or more processors to determine a second image satisfying a preset downsampling condition based on a preset downsampling rate corresponding to the target downsampling network model, the target downsampling rate and the first image comprise instructions to:

in response to that a preset downsampling rate corresponding to the target downsampling network model is equal to the target downsampling rate, determine the first image as the second image satisfying a preset downsampling condition; and in response to that a preset downsampling rate corresponding to the target downsampling network model is not equal to the target downsampling rate, pre-sample the first image based on a preset downsampling rate corresponding to the target downsampling network model and the target size, to determine the second image satisfying a preset downsampling condition.

14. The device of claim 13, wherein the one or more programs causing the one or more processors to pre-sample the first image based on a preset downsampling rate corresponding to the target downsampling network model and the target size, to determine a second image satisfying a preset downsampling condition, comprise instructions to:

determine an intermediate image size based on a preset downsampling rate corresponding to the target downsampling network model and the target size; and pre-sample the first image to determine the second image with the intermediate image size.

15. The device of claim 14, wherein the one or more programs causing the one or more processors to determine an intermediate image size based on a preset downsampling rate corresponding to the target downsampling network model and the target size comprise instructions to:

multiply the target size with a preset downsampling rate corresponding to the target downsampling network model and determining the multiplication result as the intermediate image size.

16. The device of claim 11, wherein the target downsampling network model comprises: a pixel rearrangement sub-model and a convolutional processing sub-model; and wherein the downsampling the second image based on the target downsampling network model to obtain a target image having the target size comprises:

inputting the second image to the pixel rearrangement sub-model to downsample and rearrange image pixels to obtain a first feature map with the target size; and inputting the first feature map to the convolutional processing sub-model and performing convolutional processing on features to obtain a target image having the target size.

17. The device of claim 16, wherein, when a preset downsampling rate corresponding to the target downsampling network model is an integer rate, the pixel rearrangement sub-model comprises: a first pixel reverse rearrangement model; and wherein a channel amplification factor in the first pixel reverse rearrangement model is equal to a preset downsampling rate corresponding to the target downsampling network model.

18. The device of claim 16, wherein, when a preset downsampling rate corresponding to the target downsampling network model is a fractional rate, the pixel rearrangement sub-model comprises: a second pixel reverse rearrangement model, a first convolution module and a pixel rearrangement module; and wherein a channel amplification factor in the second pixel reverse rearrangement module and a channel reduction factor in the pixel rearrangement module are determined according to a preset downsampling rate corresponding to the target downsampling network model.

19. The device of claim 16, wherein the convolutional processing sub-model comprises: a second convolution module, a third convolution module and a fourth convolution module;

the inputting the first feature map to the convolutional processing sub-model and performing convolutional processing on features to obtain a target image having the target size comprises:

inputting the first feature map to the second convolution layer for convolutional processing to obtain a processed second feature map;

inputting the second feature map to the third convolution layer for convolutional processing to obtain a processed third feature map; and inputting the second feature map and the third feature map into the fourth convolution layer for convolutional processing, so as to obtain a target image having the target size.

20. A non-transitory storage medium containing computer-executable instructions which, when executed by a computer processor, the computer-executable instructions cause the computer processor to:

determine, based on an original size and a target size corresponding to a first image, a target downsampling rate corresponding to the first image;

determine a target downsampling network model corresponding to the first image based on the target downsampling rate, at least one downsampling network model obtained by pre-training, and a preset downsampling rate corresponding to the downsampling network model;

determine a second image satisfying a preset downsampling condition based on a preset downsampling rate corresponding to the target downsampling network model, the target downsampling rate and the first image; and downsample the second image based on the target downsampling network model to obtain a target image with the target size.

* * * * *